Dec. 16, 1941.    W. B. ELMER    2,266,537
SNAP ACTING DEVICE
Original Filed Feb. 16, 1937    3 Sheets-Sheet 1

Inventor,-
William B. Elmer

Dec. 16, 1941.  W. B. ELMER  2,266,537
SNAP ACTING DEVICE
Original Filed Feb. 16, 1937  3 Sheets-Sheet 2

Inventor:
William B. Elmer

Inventor:-
William B. Elmer

Patented Dec. 16, 1941

2,266,537

UNITED STATES PATENT OFFICE 2,266,537

SNAP ACTING DEVICE

William B. Elmer, Winchester, Mass.

Application February 16, 1937, Serial No. 126,018
Renewed April 24, 1940

25 Claims. (Cl. 200—138)

The present invention relates to snap acting devices and more particularly to snap acting switches and thermostatic devices useful in electrical control.

The principal object of the present invention is to provide a snap acting device which is capable of substantially any desired amplitude of motion upon the application of a small force and which is constructed to give positive and uniform action under all conditions.

With this object in view, one form of the invention contemplates a perforated plate or diaphragm provided with a bend together with means for applying a force in a direction tending to bend the plate about an axis different from that of the inherent curvature. With this construction, the distorting force must first act to flatten the diaphragm. As the diaphragm approaches and passes through its flat position it suddenly snaps into a curvature determined by the distorting force, the sudden snap occurring in an interval of very slight change of force. As the force is relieved, the plate moves in the reverse direction with a sudden snap toward its position of initial curvature. Another form of the invention dependent upon the same principles provides for two or more inherent bends or curvatures about different axes together with means for applying a distorting force which may or may not be in such a direction as to tend to bend the plate about one of said axes. Yet another form of the invention relates to a thermoresponsive metal plate, not necessarily perforated, which is similarly subjected to conflicting bends, whereby snap action is obtained through the action of temperature changes on the plate. Such bend or bends as may be formed in the plate are preferably, though not necessarily, disposed as developable surfaces.

Other features of the invention consist of certain novel features of construction, combinations and arrangements of parts hereinafter described and particularly defined in the claims.

The invention will best be understood by reference to the following specification taken in conjunction with the drawings.

Figure 4 shows a graph of the force-deflection characteristics of the snapping member as modified to provide a fixed point of dead center, shown by Figure 3a.

Similar reference characters indicate corresponding or analogous parts throughout the several views of the drawings.

Figure 1:
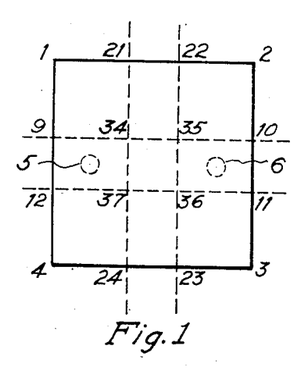
Figure 1 shows a development of the general form of the snapping member which is used to impart snap action in the devices which are the subject of this invention.

The snap acting member shown in Figure 1 comprises a square plate, originally flat, of resilient material such as thin spring steel, the outer area being designated as 1—2—3—4—1. The plate is held by a fixed support 5 and a distorting force is adapted to be applied either in an upward or a downward direction at the point 6. A permanent bend in the shape of a segment of a cylinder may be applied across the center of the plate in the area 9—10—11—12—9 on an axis parallel to a line through points 5 and 6. The plate is thus in the form of a developable surface indicated by the solid lines in Figure 3. It will be observed that an upward force applied at point 6 tends to curve the plate about an axis at right angles to the axis of original curvature. The force meets with considerable initial resistance because the plate cannot assume the transverse curvature until the inherent bend has first been flattened out. As the force becomes sufficient to make the plate approach and pass through the flat condition the plate suddenly snaps into the transverse curvature and further application of force increases the curvature. The position after snapping is indicated by the dotted lines in Figure 3. A force-deflection characteristic of this type of plate is shown in full lines in Figure 2, wherein deflection of point 6 is shown as a function of the force applied to that point 6 for controlling the motion thereof. It will be observed that the characteristic has two discontinuities which are indicative of the snapping action, one in the direction of increasing force and the other in the direction of decreasing force as shown by the arrows. Upon gradually relieving the force, the snap occurs in the reverse direction and the plate returns to its initial inherent curvature. It will be noted that the snap takes place at slightly different points in opposite directions of motion. It will be recognized that a device of this description is similar to that described by Hoopes in U. S. Patent No. 1,900,647, but is here explained to assist in the full description of my invention.

Figure 2:
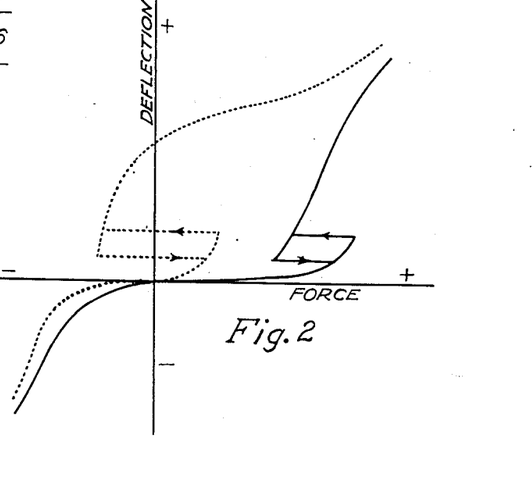
Figure 2 shows a graph of the force-deflection characteristics of the snapping member which is shown in isometric view in Figure 3 after forming from the flat plate shown in Figure 1.
Figures 3, 3A, 4:
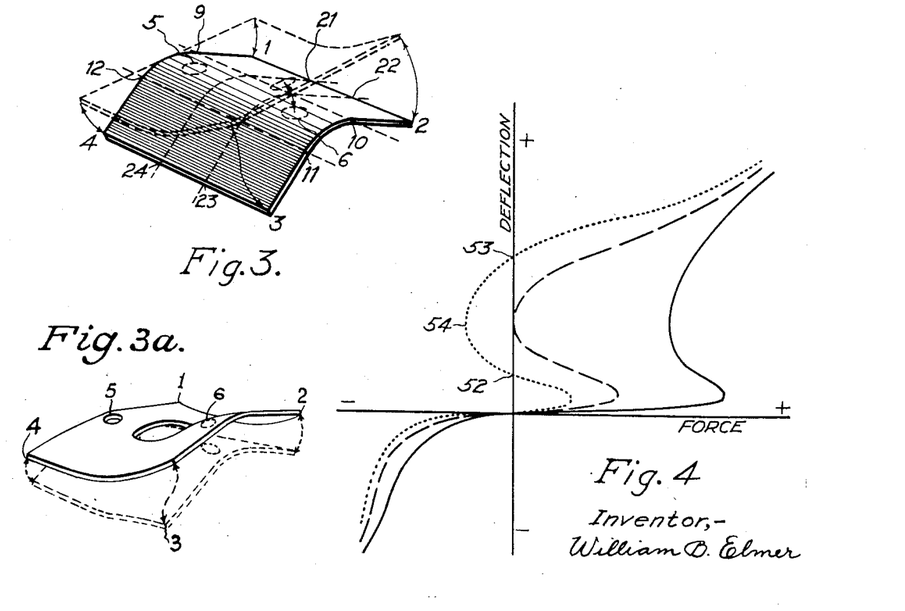

In my invention, a second bend, similar to that shown in the area 21—22—23—24—21 in Figs 1 and 3, may also be applied to the plate in addition to the first bend above described. Such a plate is easily manufactured by first bending the plate around a mandrel around one axis, then flattening the plate and bending it around the transverse axis. Such a plate has two positions of stability, one being indicated by the full lines in Figure 3 and the other by the dotted lines. The force-deflection characteristic is shown by dotted lines in Figure 2. The snapping action is the same as that obtained with a plate of single bend, but is considerably more vigorous and positive. The curve crosses the vertical axis which is indicative of the fact that after sufficient force has been applied to make the plate snap through the flattened condition, it is inherently stable in its new curvature about the transverse axis.

The type of plate shown in Figures 1 and 3 with single or multiple inherent curvatures and several modifications thereof are adapted for a wide variety of uses as will hereinafter be described in detail.

One modification contemplated in my invention is that whereby a different type of snap action may be provided. It may be seen in Figure 1 that the bends intersect in the area 34—35—36—37—34. The internal stresses in this area of intersection are very complex and are of greater magnitude than those in the remainder of the plate. These stresses account for the discontinuities in the force-deflection characteristic of Figure 2. According to the present modification, a part or all of the area of complex internal stress is removed. Such a plate with the area of superimposed curvatures substantially removed but otherwise like that of Fig. 3, is shown in Fig. 3a and its force-deflection characteristics are as shown in Figure 4, the full line representing the case where a single bend only is applied and the dotted line representing the action where the plate is provided with two inherent transverse curvatures. It will be observed that the curves are smoother than those of Figure 2, there being no regions of discontinuity. The dotted curve of Figure 4 shows a point of dead center at 52 indicating a position of equilibrium at which the plate might theoretically remain substantially flat. The dead center or equilibrium point 52 is, however, unstable and as a practical matter cannot be maintained without external support. In practical operation, therefore, the plate under the action of a distorting force has a quick snap from one position to the other. Owing to the elimination of the highly complex center stresses the curve is continuous and the point of dead center 52 is identical for either direction of motion between the two points of stability.

A further modification of the invention consists in the disposition of the two transverse bends in such a manner that neither coincides with the line between points of contact and support. A plate constructed with two oppositely curved transverse bends, in which the line between support and contact lies midway between bends, will be observed to provide a snap action representable by the dotted curves shown in Figures 2 or 4, except that the curves will be found perfectly symmetrical in the two directions of motion.

By constructing plates of the type described with two opposing bends which are of unequal radii, variations in snap action will be obtained. As the radii of the bends are varied, force deflection characteristics similar to those shown in Fig. 2 and Fig. 4 will be obtained, but shifted to form a complete family of similar curves in each case. The negative force loop 52—54—53 on the dotted curve in Fig. 4, may be made smaller until at the point of approximate tangency to the deflection axis as shown in the dashed curve, a very slight negative pressure will throw the spring from one stable position to the other.

A perforation in the plate, of reduced size, will give an action intermediate to those described in connection with Figures 2 and 4. The perforation may be made in any desired shape for various applications in operating snap acting devices as will be described subsequently. Various relations between thickness, width of covered areas and size and shape of perforation will give a variety of actions over the complete range of possibilities extending from a snap action with discontinuities and with shifting point of dead center to a snap action without discontinuities and with fixed point of dead center, which is equivalent to a pure toggle action. Intermediate characteristics may be obtained by proper adjustment of the various dimensions, such as that in which a curve of the type shown in Figure 4 is provided with a slight discontinuity, or in which a discontinuity exists in one direction of motion only.

Among the several useful modifications of the invention is that obtained by using a plate of the type represented by area 9—10—11—12—9 of Fig. 1. Such a plate provides a snap action of the type represented in Fig. 4, although there is no central perforation.

Another useful modification is that obtained by the use of a plate of the type represented by area 34—35—36—37—34 of Fig. 1. This is the area in which the bends intersect, and the same action may likewise be obtained by increasing the width of both bent areas until they cover the entire surface of the plate. A device so constructed of simple resilient material will be recognized as an element of the device described by Winger in U. S. No. 1,872,205.

Plates or diaphragms of the type described will give unlimited angular amplitudes of motion. By selecting plates of relatively large area and thin cross section, both positions of stability can assume the configuration of a cylinder or roll with one or more convolutions.

Certain of the resilient plates which have been described can, if made of composite thermostatic metals, be operated by temperature changes as well as by mechanically applied forces. Those snap acting devices which I have described as being constructed with two or more bends with like curvature will in general not be so operative. There must be two bends of opposite curvature to obtain the strongest thermoresponsive action. Secondly I have found that the two conflicting bends applied to the material must not be too sharp, otherwise in some instances the force available by virtue of the thermoresponsive action of the composite metal will not be sufficient to move said plates through their positions of instability. Such devices will give strong snap action over wide amplitudes of motion and are useful for thermostatic applications. The best thermostatic action is obtained from those devices with superimposed transverse stresses covering their entire areas.

Snapping springs, constructed of simple or thermo-responsive composite materials, are useful for operating electrical contacts, shutters, valves, etc. The simplicity, compactness, strength, sensitivity and permanence of this device make it desirable for use in many existing applications and bring into economic practicability many new applications for abrupt action of electrical contacts, especially in the smallest and most sensitive classes of electrical contact equipment. For operation of electrical contacts I prefer to mount one end of the toggle device rigidly and to mount an electrical contact upon the opposite end, although many variant arrangements are useful.

Figure 5:
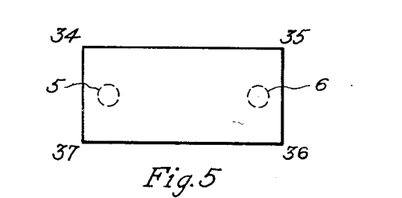
Figures 5 to 10, inclusive, show developed views of various shapes of snapping springs.

Figure 5 represents the simplest form of snapping element. In a device, when constructed of composite thermoresponsive material and supported at fixed point 5, contact 6 will move abruptly between the two natural positions of stability in response to appropriate changes of temperature, whereas previously used flat strips of such material move with slow gradual motion. The amplitude of motion is great and the action strong with my device. When electric current is passed through the length of this device, it is useful in providing a thermally operated electrical circuit breaker or relay of inexpensive construction, which can be adapted easily to provide manual reset, trip free or automatic reclosing features.

Figure 6:
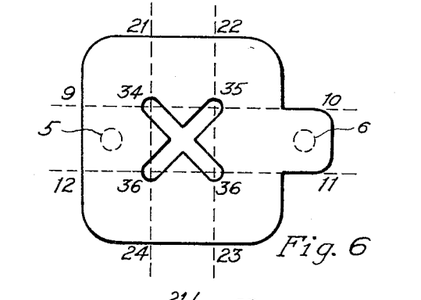

Figure 6 shows a modification of my snapping device of the type with fixed dead center, which gives the strongest action for a given weight of material. This general type is adapted to many applications, including the most sensitive and minute applications, for the operation of electrical controls where previous forms have been too erratic because of mechanical friction or have been too stiff. Central perforation 34—35—36—37—34 is constructed in the form of a diagonal cross, which permits the four tapering inward extensions of the curved surfaces 21—22—35—34—21, 35—10—11—36—35, 37—36—23—24—37 and 9—34—37—12—9 to contribute toward effecting the snap action, and yet allows a maximum amplitude of motion of electrical abutment contact 6 through avoiding superposition of the conflicting bends at any point in the central area of the device. The corners of the square are rounded off to conserve space. The extended arm used for carrying abutment contact 6 is rigid by virtue of its arched cross-section, thus enabling the spring to render the perfect toggle action provided through its property of having the fixed center of stability. Previous snapping devices operating through the action of dents or other distortions are ineffective for applications where a fixed center of snap is required, because of the resiliency of the extended contact arms.

Figure 7:
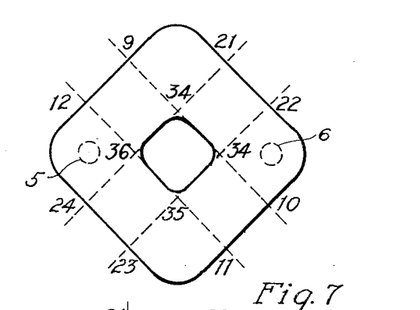

Figure 7 shows a snapping spring in which neither of the bent areas coincide with the line between support 5 and contact 6, but are angularly separated by 45° therefrom. This modification gives symmetrical action in the two directions of motion with respect to dead center provided the bends are equal, and is therefore useful for double-throw snap switch action. There is also present a slight torsional component in the motion of area 22—10—35—22 which makes desirable the use of an electrical contact 6 with spherical surface. Lack of concavity of the supporting and movable ends simplifies the problems of support and mounting of the contact, but introduces the necessity for providing additional stiffening means if it is desired to avoid losing the fixed point of dead center of the snap action for both directions of motion. It is sometimes desirable to avoid having the dead center so fixed, and a plate of the type shown in Fig. 7, without stiffening means, is useful in providing a thermostat which maintains a strong contact pressure up to the instant of snap, thereby avoiding vibration difficulties.

In general, forms of snapping devices other than that shown by Figure 7 are preferable for single throw snap switch operation because of the asymmetry of the action in the two directions, since the electrical contact member 6 is best attached to the convex side of the movable end when speed of separation of the contacts is paramount, and on the concave side when high contact pressure is the desired condition.

Figure 8:
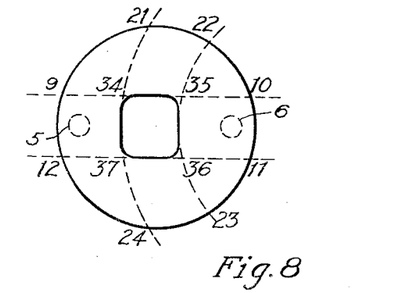

Another useful adaptation of the principle of the invention is shown in Figure 8, in which a snapping device is provided through the application of one cylindrical and one toroidal bend to the resilient plate. It will be observed that when a plane surface is bent sharply along a curved line, the resulting contour resembles that of two conical surfaces intersecting along the line of the bend. In applying such a bend to the surface of a resilient plate, the bend cannot be made sharp without danger of cracking the resilient material, but must have a moderate radius of curvature, with the result that the curved surface is representable by a segment of a torus. Such a bend in an originally flat plate is undevelopable and must be produced by warping or distorting the plate slightly. In general, I prefer to obtain the snap action described by the use of developable surfaces, but in this instance, the use of an undevelopable surface is advantageous. In general, any undevelopable bend used in my invention can deviate but slightly from being developable, otherwise the device would not be operative. It is necessary that any undevelopable curvature be capable of distortion into the flat state without exceeding the elastic limit of the resilient material.

A snapping spring constructed with one toroidal bend and one cylindrical bend has valuable characteristics, and is particularly useful in giving more symmetrical snapping action than is obtainable with two cylindrical bends, and hence it is applicable in the construction of double-throw switches when the torsional effect and lack of rigidity of the arms, characteristic of the form shown in Figure 7, are objectionable. Snapping devices with two or more toroidal bends can also be constructed.

Figure 9:
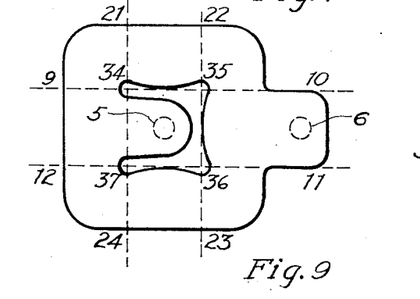

Figure 9 shows a variant form of snapping device in which the supporting arm 5 is carried inwardly into the central perforation instead of outwardly. This provides a form of snapping device for general applications which is especially compact and free from the effect of foreign vibrations.

Figure 10:
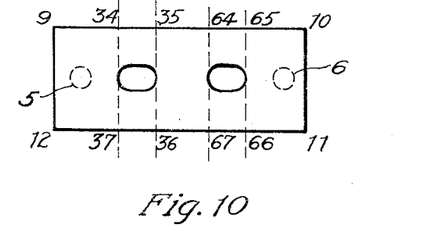

Figure 10 shows a compound toggle action obtained from intersection of bends in two areas 34—35—36—37—34 and 64—65—66—67—64. This form of the device provides a basis for 3-position snap switch operation.

Figure 11:
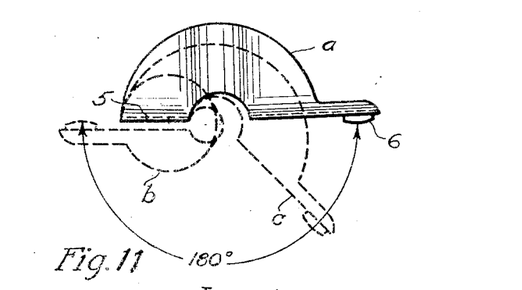
Figure 11 shows an elevation of a snapping spring capable of action through an amplitude of 180° of arc.

Figure 11 shows a snapping spring with dimensions so selected that the amplitude of travel of the movable contact arm 6 extends through a full 180° of angle. Fixed point of dead center is shown at point c.

Any desired amplitude of motion, position of dead center and strength of snap action may be selected within the limits of strength of the resilient material used, through appropriate selection of dimensions of thickness, outline, central perforation length of arm, angular relation between axes of curvature, radii and angles subtended by curvatures, and other minor factors.

Varying the thickness of the resilient material varies the strength and amplitude of the motion, strength being rapidly increased and amplitude decreased with increase in thickness. Varying the length of the arm or the size of the central perforation varies the strength and the amplitude of the motion, strength being decreased and amplitude increased by increase in arm length and perforation size. Varying the outline dimensions chiefly varies the strength of the motion, larger areas giving increased strength. The radii of the bends are determined by the nature and thickness of the material unless full advantage is not to be taken of the resiliency of the material, in which case lesser radii may be used for the bends, or the radii may be varied to govern the position of dead center between the extremes of travel. An angular distance of 90° between opposing bends always gives the strongest snap action. The angular positioning of the bends with respect to the supporting point and free end, influence the snap action profoundly as described in one instance in connection with Figure 7.

I have found that snapping devices made with two concave and intersecting bends are capable of producing not only the type of snap action already described, but also a torsional snapping effect of which the spring with two opposite bends is not capable, and it has other properties which give it useful applications.

Improper support of the snapping device such as by compression between surfaces which tend to flatten its normal curvature will be found to interfere with its operation. If too large a hole is cut near that portion of the spring which is under the greatest stresses, its behaviour will also be impaired. It is best to avoid, insofar as possible, any confinement of the curvature of the device by the securing means or contact mounting. In order to accomplish this result, it is sometimes advisable to divide the bend, if it runs through the line of support and contact, thus providing two parallel bends, and allowing a narrow, flat band to remain between these two bends, which band may be used for fastening and contact-supporting without interference with the snapping action. The manner of supporting snapping springs of the type described is extremely important in determining the precise characteristic to be obtained. It is sometimes desirable to include flat or curved washers of various outline forms in the supporting means to obtain special characteristics of action. Proper selection of dimensions, curvatures, and supporting and contact means can be used to provide devices which have secondary snapping action in various portions of the area of the device, at certain points in the travel between the limits of the action.

In manufacturing the snapping spring, I have found that the strongest action and fullest utilization of the properties of the spring material are obtained by bending the spring successively about mandrels as sharply as the strength of the material will permit without danger of fracture. In some cases the first bend must be rebent but to a lesser radius after the second bend has been applied. The bends may also be applied by drawing the spring material over a corner, while in tension, or by rolling between two compressive surfaces or by other methods which will be apparent to those skilled in the art. I have also found it advantageous, when making a spring out of hard naturally grained material such as tempered steel, to avoid placing the axis of either bend, when possible, parallel to the grain of the material. For the usual spring with two bends 90° apart, it is preferable to arrange that the grain of the spring metal shall be in a line 45° or midway between the axes of the two bends, but it is preferable to use a material without grainy structure.

It is advantageous to keep the weight of the electrical contact carried by the movable end of the snapping device to a minimum in order that the acceleration of the contact may be as rapid as possible during the operation.

Where increased strength of action is desired, supplementary resilient means may be applied in the form of helical or bowed springs attached to the edges of the plate in such a manner as to augment the existing bends.

The principle of action of the snapping device described depends upon the fact that it is impossible to bend any plane surface about any given line if said surface is already bent about any other line intersecting the given line without warping, stretching or distorting the surface. Before a surface can be folded or bent along any line whatsoever, all existing folds or bends along other but intersecting lines must be straightened along the line of intersection and the sheet brought into approximately a plane state along this line. Thus, if a sheet of paper be folded along any line, it is necessary to unfold the paper along this line into substantially a flat state before it is possible to refold it along any new line which intersects the original line of fold. This is true whether the folds are in the same or opposite directions. Any attempt to bend a plate which is already bent along an intersecting line tends to flatten the existing bend. Understanding of the nature of the action described makes obvious the fact that my snap acting spring cannot be manufactured by any single bending operation, since any attempt to create two simultaneous bends of appreciable curvature with intersecting axes would unduly stretch or warp the spring material used, and relieve the conflict between internal stresses depended upon for operation.

Through proper application of the snapping member described, it is possible to construct a great variety of snap-acting thermostats and snap-acting electrical control devices, such as manual or automatic devices for opening and closing of electrical circuits. Among the various snap-acting devices which may be constructed are snap switches for use as wall switches, electric service and control switches, telegraph keys, electric power and communication relays, time switches, thermal control devices, such as thermostats to control cooking and heating devices, refrigerating devices, and a multitude of other applications.

Typical snap-acting electrical controls using in their construction the snapping members described, are shown in Figures 12—13—14—15—16 and 17.

Figure 12:
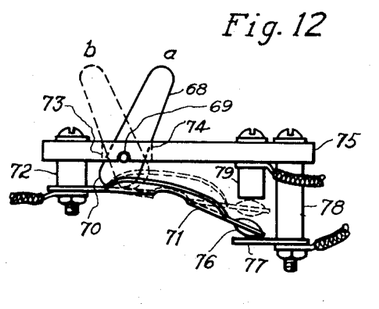
Figure 12 shows a hand operated snap switch incorporating my snapping member to obtain snap action of electrical contacts.

Figure 12 shows a hand operated single-pole, double-throw snap-switch. Insulated lever 68 rotates about fixed journal 69. Cam shaped end 70 of lever 68 presses against steel snapping spring 71 near the point of attachment to fixed support 72. Lever 68 is limited as to angular motion by the length of opening 73—74 in insulating panel 75 which forms the base for the switch. When lever 68 is operated from position a, shown by solid lines, to position b, shown by dotted lines, cam 70 abuts spring 71 near point of support, deflecting said spring toward the position shown in dotted lines, and reaching position of stability beyond the dead center of pressure. Movable contact 76 carried by spring 71 is thereby pressed against stationary contact 77 mounted on fixed support 78. Resistance of fixed contact 77 to the motion of movable contact 76, forces spring 71 over its point of dead center, and contact 76 on the free end of spring 71, having no restraint, snaps into the alternate position as shown in dotted lines in contact with stationary contact 79, opening the electrical circuit between supports 72 and 78 and establishing the electrical circuit between supports 72 and 79. When lever 68 is returned from position b to position a, the reverse operation takes place. In this case cam 70 moves past dead center of pressure and away from the end of snapping spring 71, allowing said spring to deflect back toward its original position. Contact 79 prevents corresponding motion of contact 76, the point of dead center of the snapping spring is reached and the contact 76, without restraint, snaps to the original position, thus reestablishing the original electrical circuit. A desirable wiping action of contacts 76, 77 and 79 is obtained in connection with the sequence of operations described.

The single-pole double-throw snap-switch, shown in Figure 12, may be converted into a single-pole single-throw switch by substituting an insulated stop-member for either of the stationary contacts 77 or 79.

In the device shown in Figure 12, the amplitude of the rotational motion of the movable contact may be decreased by supporting the snapping spring at the free end of an intermediate relatively stiff resilient member or a hinged member which is in turn supported by post 72.

Figure 13:
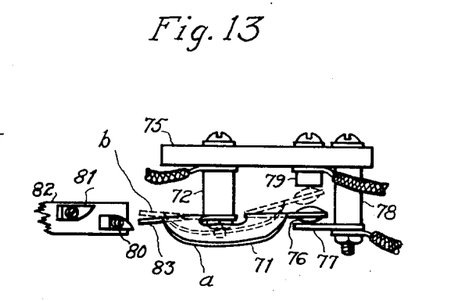
Figure 13 shows a variant form of mechanically operable form of snap switch such as is readily adaptable for use in time switches.

A second example of the application of the snapping device to electrical controls is shown in Figure 13. In this figure, snapping spring 71 is of the type shown in Figure 9, and is attached by means of its inwardly extending ear to fixed support 72 mounted on insulating base 75. Two positions of stability of snapping device 71 are shown by a and b, in which contact-supporting end 76 makes contact with contact 77 mounted on post 78, and contact 79, mounted on base 75, respectively. Snap action of contact 76 between contacts 77 and 79 is accomplished by engagement of any mechanical means such as dogs 80 and 81 mounted on wheel 82, with end 83 of snapping device 71. As wheel 82 rotates with the edge carrying dogs 80 and 81 moving away from the viewer, dog 80 first engages end 83, exerting upward thrust. Flexure of the central supporting arm which extends inwardly into the central perforation of the snapping device 71, permits end 83 to move upward, tending to carry contact 76 downward. Resistance to such downward motion provided by fixed contact 77 throws the snapping device over dead center, the device abruptly assuming its alternate position of stability b shown by dotted lines in Figure 13. Continued rotation of wheel 82 causes dog 81 to engage end 83, exerting downward thrust against end 83, resulting in return of contact 76 to its original position shown in solid lines as a, with snap action as previously described. Dogs 80 and 81 may represent the operating dogs on the dial of a time switch. Any equivalent mechanical means or manual operation, may be substituted for the dogs 80 and 81 to obtain the action described.

Contacts may be mounted on the side wings or at other various points on the surface of spring 71 in any arrangement and number to obtain multi-pole single or double throw switch operation.

The snap acting electrical control can be usefully adapted to operate in conjunction with thermostatic devices in many ways. For oven heating control, the end of an expanding rod can be substituted for cam 70 of Figure 12, expansion and contraction of the rod with temperature changes operating the contacts in the manner described. The small deflection required to operate the snapping member at the point of contact with cam 70 eliminates the need for mechanical amplifying means.

Figure 14:
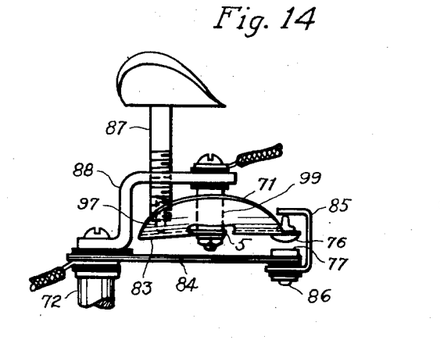
Figure 14 shows my snapping member incorporated in a snap acting temperature control for electric irons, refrigerators or other devices subject to such control.

Figure 14 shows a thermostatically operated snap acting control of the type commonly used to control the temperature of electric irons, refrigerators, water heaters and such devices. In Figure 14 snapping spring 71 of the type shown in Figure 9 is mounted with its fixed end 5 attached to insulated supporting post 99 in fixed support 88. Composite thermostatic strip 84, mounted on and insulated from supporting post 72, in common with support 88, is influenced by the surrounding temperature so that its unsupported end deflects upwardly or downwardly. For control of elevated temperatures, the thermostatic strip deflects upward as it heats and downward as it cools. For control of low temperatures the thermostatic strip is inverted. Rivet contact 77 is supported by and in electrical contact with the free end of bimetallic strip 84 and abuts movable contact 76 carried by the movable end of the snapping spring. U-shaped member 85 is insulated from and attached to the deflecting end of thermostatic strip 84 by means of insulated end of contact rivet 77 which is headed over at its back end 86. Member 85 serves to limit the gap separation between contacts 76 and 77 while the contacts are in the open position. I prefer to use a separation of about 0.020″ between contacts while in the open position for most applications of my device to alternating current controls. As the thermostatic strip deflects upward and downward, contacts 76 and 77 are brought together and separated with snap action in the manner previously described. By rotation of screw 87, which is threadably engaged in fixed support 88, and the end of which screw is fitted with insulated extension 97, toggle spring 71 is correspondingly elevated or lowered, changing the position of dead center of contact arm of snapping spring 71, and hence changing the temperature at which the switch contacts operate. Hot or cold temperature control is thus obtained by adjustment of screw 87.

It may sometimes be desirable to secure a substantial reduction in the size of the snapping spring through removal of the necessity for such wide amplitude of operation as may be imposed by the natural limits of travel of strip 84, and this purpose can be accomplished by the addition of a rigid stopping member which is so disposed as to limit the travel of the U-shaped terminal member 85 within the desired limits of amplitude. For example, such a member may be mounted on support 99 in common with snapping spring 71 and be provided with an U-shaped end which is disposed outwardly to engage loosely the backwardly extended end of U-shaped member 85 and thereby prevent extremes of travel of the thermostatic strip 84.

The simplicity and absence of mechanical friction in the operation of the thermostatic device described affords control of temperature within much narrower limits than can be obtained reliably with other designs of thermostatic controls for similar purposes and also avoids erratic operation which results from variations in friction as mechanically produced snap actions wear with use.

Figure 15:
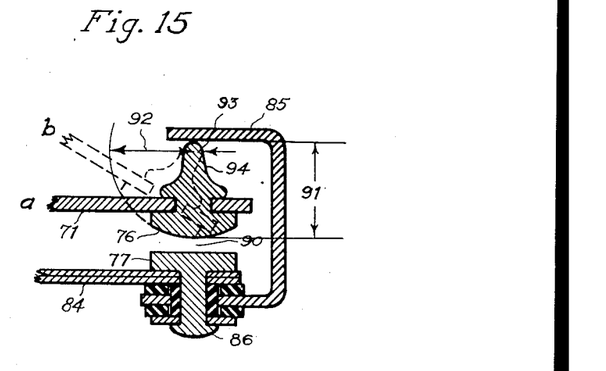
Figure 15 shows a detail of the contacts used in the snap acting control shown in Figure 14.

Figure 15 shows a detail of the contact arrangement used in Figure 14. Due to the tilt of the contact carrying arm 71 during operation, I use a contact support whose overall height 91 in a direction normal (perpendicular) to the contact face 77 is constant for any tilt, and is equal to the sum of the radius 92 of the main contact plus the radius 93 of the end of the cylindrical back stop 94 as shown in Figure 15. Electrical abutment contact rivet 77, supported by strip 84, is constructed of silver or other suitable conducting material, and has a flat abutting contact surface. The U-shaped backstop member 85, insulatedly attached to strip 84 by means of contact rivet 77, is so disposed that the extended arm of the U presents a flat surface, parallel to and facing the flat contact surface of rivet 77. Between these two flat parallel surfaces of fixed separation, contact member 76 moves in abutting relation to said surfaces. The abutting contact surface of member 76 facing contact surface 77, is rounded, with radius of curvature constant at all points of the surface, as shown by radius dimension 92. The opposite side of contact member 76 is provided with cylindrical extension 94 which terminates in a second rounded surface, with radius of curvature also constant at all points of the surface as shown by radius dimension 93. The radii 92 and 93 of the curvatures described originate from a common center of radius, as shown in Fig. 15. By virtue of this construction, the overall height of the contact member 76 in a direction normal to the said flat surfaces is constant and equal to dimension 91 shown in Fig. 15, independently of the angle of tilt of supporting member 71, which carries movable contact 76. For example, in the tilted position *b* shown by dotted lines in Fig. 15, the dimension 91 of member 76 is seen to remain the same as when the said member 76 is in normal position *a* shown by solid lines. Since the height 91 remains constant, the gap 90 between contacts 76 and 77 also remains constant when the contacts are in the open position, independently of the relative angular relation between members 71 and 84. This gap spacing is chosen to provide for optimum performance and wear of the electrical contacts.

Figure 16:
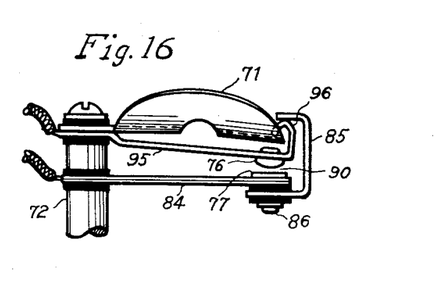
Figure 16 shows an alternative contact arrangement for my snap acting control.

Figure 16 shows the detail of an alternative contact arrangement applicable to any of the snap-acting electric controls which are the subject of this invention. In this arrangement, snapping spring 71 is mounted on support 72 in common with relatively weak spring strip 95 which carries contact 76 and is shaped with hooked end 96 to engage the back side of snapping spring 71 with allowance of gap 90. Also mounted on insulating post 72 is thermally actuable contact supporting member 84 to which is secured U-shaped end 85 attached by means of insulated stem of rivet contact 77 with back end headed as shown by 86. Weak spring 95 is so adjusted as to normally hold contacts 76 and 77 together. When contact 77 moves in a direction away from contact 76, under the influence of temperature change, the end of U-shaped member 85 presses against hooked end 96 of member 95, which in turn presses against the free end of snapping spring 71. When spring 71 reaches dead center, it snaps downward, releasing weak spring 95 with contact 76, and cooperating therewith in abruptly closing contacts 76 and 77. Upon upward return of thermostatic arm 84 and contact 77, under the influence of temperature change, toward the original position shown in Figure 16, pressure of contact 77 against contact 76 is transmitted through contact 76 and weak spring 95 to the movable end of snapping spring 71, which is eventually again thrown back over dead center. During this operation, the free end of snapping spring 71 suddenly abuts hooked end 96 of weak spring 95, thereby picking up contact 76 against the resistance of member 95 and separating it from contact 77 with great speed. Hooked end 96 finally comes to rest against U-shaped end 95, allowing the contacts to remain separated by gap distance 90. This contact arrangement provides a snap acting control which is especially free from the influence of foreign vibrations and gives a more sudden interruption to the circuit than is obtained by the previously described arrangements.

By adjusting the strength and the free position of rest of spring 95 in Figure 16, different modes of action can be obtained among which is that of a 3-position snap switch.

Figure 17:
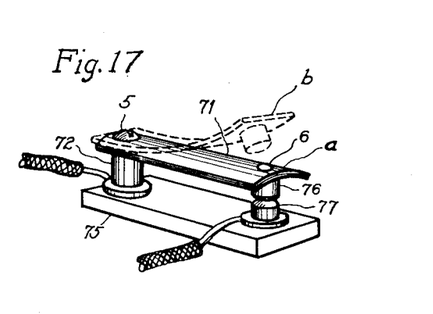
Figure 17 shows a variant arrangement for a thermostatic snap acting control using a snapping member constructed of composite thermoresponsive metal.

Figure 17 shows a simple form of thermostatic control consisting of snapping spring 71 constructed of thermoresponsive composite material in the form shown developed in Figure 5. This snapping device is supported at end 5 by post 72 in insulating base 75, and carries electrical contact 76 at movable end 6. Insulating base 75 carries contact 77 disposed to be abutted by contact 76. Contacts 76 and 77 meet abruptly at one fixed temperature and separate abruptly at a different fixed temperature of snapping member 71. Member 71 may be constructed with a single bend on its transverse dimension, in which case it will at room temperature have a single position of stability *a* as shown in solid lines in Figure 17. It may optionally be constructed with conflicting transverse bends of opposite curvature 90° apart, in which case it will at room temperatures have a second position of stability as shown by *b* in dotted lines. In this latter case, the device shown constitutes an automatic circuit breaker, since the flow of sufficient electric current through strip 71 will cause heating, resulting in the separation of contacts 76 and 77 with snap action. The device with two conflicting bends will remain open after cooling, and can then be reclosed by any suitable mechanical or manual means. Such a device constructed with the single bend and single position of stability will open itself with snap action upon flow of excessive current through the strip 71, and will automatically reclose upon cooling. By the application of suitable latching means, an automatic reclosing circuit breaker may be constructed, with optional provision for locking out after any desired number of reclosures. Circuit breakers of this type can be made trip-free by suitable construction of the manual resetting device. An automatic circuit breaker with a wide variety of control features is thus provided by extremely simple means.

In all of the switches described, a desirable wipe of the electrical contacts is obtained through the natural action of the device as described. In certain instances it may be advantageous to use condensers in the electrical circuit to reduce contact wear and radio interference due to arcing at the contacts.

The devices which are hereinbefore described represent several typical applications of the snapping member in the construction of snap acting devices. It is not to be assumed that this invention is limited to these applications described, nor that the applications described are not susceptible to many variations not specifically mentioned.

The chief advantages of the devices described are: the freedom from friction, sensitivity, high mechanical efficiency, compactness, adaptability and inexpensiveness.

I claim as my invention:

1. A snap acting device with fixed position of dead center, comprising a resilient plate having two inherent curvatures with axes at substantially right angles; one curvature being convex, and the other relatively concave; said plate being so perforated that the area of superposition of said curvatures is substantially removed; said plate being capable of assuming two stable conformations.

2. A thermostatic control comprising a snap acting member consisting of a resilient plate having two inherent curvatures with axes intersecting at substantially right angles, one curvature being convex and the other relatively concave, said plate being so perforated that the area of superposition of said curvature is substantially removed, said plate being capable of assuming two stable conformations, and operable between said conformations by cooperating thermostatic means in response to temperature variations; said plate carrying electric contacting means movable between flat parallel surfaces of fixed separation, said contact means having curved contours on both front and back surfaces such that the maximum overall dimensions in a direction normal to said flat surfaces is constant in all conformations of the device; and means for adjusting the temperature at which the snap action occurs.

3. A snap acting device comprising a resilient plate having an inherent gradual bend, a perforation within and of less width than said bend, and means for applying forces causing the plate to flex and release with snap action about an axis commonly intersecting the axis of said inherent bend and said perforation, whereby a snap acting device is afforded having relatively slight difference of position of dead center of snap in the two directions of motion, substantially as described.

4. A snap acting device comprising a resilient plate having an inherent gradual bend, a perforation substantially traversing said bent portion, and means for applying forces causing the plate to flex and release with snap action about an axis commonly intersecting the axis of said inherent bend and said perforation, whereby a snap acting device is afforded having a common position of dead center of snap in the two directions of motion, substantially as described.

5. A snap acting device comprising a resilient plate having an inherent gradual cylindrical bend along a straight axis, a second inherent gradual toroidal bend along a curved axis, said axes intersecting in said plate, and means for applying forces causing the plate to move with snap action through its positions of instability in both directions of motion, substantially as described.

6. A snap acting device comprising a resilient plate having two inherent gradual bends, the axes of said bends intersecting in the plate, a perforation within the area of intersection of said bends of less width than at least one of said bends and means for applying forces causing the plate to move with snap action through its positions of instability in both directions of motion, whereby a snap acting device is afforded having relatively slight difference of position of dead center of snap in the two directions of motion, substantially as described.

7. A snap acting device comprising a resilient plate having two inherent gradual bends, both of less width than the corresponding dimensions of the plate and with axes intersecting in the plate, a perforation extending substantially to the four corners of the area of intersection of said bends, and means for applying forces causing the plate to move with snap action through its positions of instability in both directions of motion, whereby a snap acting device is afforded having a common position of dead center of snap in the two directions of motion, substantially as described.

8. A snap acting device comprising a resilient plate having two inherent gradual bends, both of less width than the corresponding dimensions of the plate and with axes intersecting in the plate, a perforation in the area of intersection of said bends so disposed as to prevent superposition of both bends at any point in the plate, and means for applying forces causing the plate to move with snap action through its positions of instability in both directions of motion, whereby a snap acting device is afforded having a common position of dead center of snap in the two directions of motion, substantially as described.

9. A snap acting device comprising a resilient plate having two inherent gradual bends, the axes of said bends intersecting in the plate, supporting means supporting said plate near one edge and at a point on a line in the plate substantially bisecting the angle between the axes of the two said inherent beads and means near the opposite edge and on said line for applying forces, causing said plate to move with snap action through its positions of instability in both directions of motion, whereby a snap acting device is afforded having similar action in both directions of motion, substantially as described.

10. A snap acting device comprising a resilient plate having two inherent gradual bends both of less width than the corresponding dimensions of the plate, the axes of said bends intersecting in the plate, a perforation extending substantially to the four corners of the area of intersection of said bends, and means for applying forces along a line substantially bisecting the angle between the axes of the two said inherent bends, causing said plate to move with snap action through its positions of instability in both directions of motion, whereby a snap acting device is afforded having a common position of dead center of snap in the two directions of motion, and of similar action in both directions, substantially as described.

11. A snap acting device comprising a resilient plate having two inherent gradual bends both of less width than the corresponding dimensions of the plate, the axes of said bends intersecting in the plate, one said curvature being convex and the other relatively concave; a perforation extending substantially to the four corners of the area of intersection of said bends; a relatively narrow outward extension of said plate lying in a line substantially bisecting the angle between the axes of the two said inherent bends, a support for the plate on said line in that portion of the plate opposite said extension, and means for applying forces to said extension causing said plate to move with snap action through its positions of instability in both directions of motion, whereby a snap acting device is afforded having a relatively slight difference of position of dead center of snap in the two directions of motion, of similar action in both directions, and retaining a substantial pressure up to the point of snap, substantially as described.

12. A snap acting thermostat comprising a thermoresponsive composite metal plate having two inherent gradual bends both of less width than the corresponding dimensions of the plate, the axes of said bends intersecting in the plate at substantially right angles; one of said bends being convex and the other relatively concave; and said plate having a perforation extending substantially to the four corners of the area of intersection of said bends; whereby a thermostat is afforded capable of snapping through the points of instability in either direction of motion in response to temperature variations, substantially as described.

13. A thermostatic control comprising a resilient plate having two inherent bends, both of less width than the corresponding dimensions of the plate, and with axes intersecting in the plate, one of said bends being convex and the other relatively concave, said plate having a perforation extending substantially to the four corners of the area of intersection of said bends, cooperating thermoresponsive means adapted to operate said plate with snap action through its positions of instability in response to temperature variations; cooperating electrical contact means adapted to be operated by said snap action, and means for adjusting the temperature at which said snap action occurs, substantially as described.

14. A thermostatic control comprising a resilient plate having two inherent bends with axes intersecting in the plate, one said bend being convex and the other relatively concave, said plate having a perforation extending substantially to the four corners of the area of superposition of said bends; cooperating thermostatic means adapted to operate said plate with snap action through its positions of instability in response to temperature variations; said plate carrying electrical contacting means movable between flat parallel surfaces of fixed separation, said contact means having curved contours on both front and back surfaces such that the maximum overall dimensions in a direction perpendicular to said flat surfaces is constant in all conformations of the device; and means for adjusting the temperature at which snap action occurs, substantially as described.

15. In combination with an electrical control device, a flat electrical contact surface, a second flat surface fixed parallel to said flat contact surface, and in facing relation thereto, an electrical contact member carried between said flat surfaces, and movable in abutting relation therewith, the abutting contact face of said movable contact member having a curvature of constant radius, the opposite abutting surface of said movable member having a curvature of constant radius, and the centers of both said radii being common.

16. A snap acting device comprising a resilient plate formed with a plurality of inherent curvatures about different axes, said curvatures intersecting so as to conflict, whereby said plate is capable of assuming a plurality of different stable conformations, said plate having a perforation in the area of super-imposed curvatures embracing enough of said area of super-imposed curvatures that said plate exhibits substantially a fixed dead center characteristic in passing back and forth between its different stable conformations.

17. A snap acting device comprising a resilient plate having two inherent cylindrical bends intersecting in said plate, whereby the curvatures of said bends conflict and impart to said plate a snap acting characteristic, said plate being perforated in the area of intersection of said curvatures for reducing the forces of conflict therebetween.

18. A snap acting device comprising a resilient plate having an inherent gradual bend, a perforation within and of less width than said bend, and means for mounting said plate to permit flexure thereof about an axis commonly intersecting the axis of said inherent bend and said perforation whereby said plate is capable of flexing with a snap action with relatively slight difference of position of dead center of snap in the two directions of motion.

19. A snap acting device comprising a resilient plate having an inherent gradual bend, a perforation substantially traversing said bent portion and means for supporting said plate, leaving it free to flex and release with a snap action about an axis commonly intersecting the axis of said inherent bend and said perforation, whereby said snap acting device has a common position of dead center of snap in its two directions of motion.

20. A snap acting device comprising a resilient plate having two inherent gradual bends, both of less width than the corresponding dimensions of the plate and intersecting each other in the plate, a perforation extending substantially to the four corners of the area of intersection of said bends whereby substantially to prevent the superposition of the two bends at any point in the plate so that the plate exhibits a common position of dead center of snap in its two directions of snap motion.

21. A snap acting device comprising a resilient plate having a plurality of inherent curvatures intersecting in said plate, whereby said curvatures conflict to make the plate capable of assuming a plurality of stable conformations and means for applying forces tending to bend the plate about an axis different from any of the axes of said inherent curvatures.

22. A snap acting device comprising a resilient plate having two inherent curvatures intersecting in said plate, whereby said curvatures conflict and impart to said plate a snap acting characteristic, said plate being otherwise substantially flat and unstressed and means for mounting said plate substantially off the axis of the said inherent curvatures, whereby when said plate executes a snap action, a movable portion of said plate remote from said position of mounting moves substantially about an axis different from either of the axes of said inherent curvatures.

23. A snap acting device comprising a resilient plate having two inherent gradual bends intersecting each other in the plate, so that said two bends conflict and give the plate a snap action characteristic, and means for mounting said plate substantially on the bisector of the angle between the axes of the two inherent bends so that a part of said plate remote from said point of mounting is free to move, whereby said remote point moves with a snap action approximately about an axis perpendicular to said bisector on which said plate is mounted.

24. A snap acting device comprising a resilient plate having two inherent gradual bends intersecting each other in said plate in substantially a right angle, means for supporting said plate at a point substantially off the axis of both said bends, whereby said bends have a maximum conflicting effect to impart a pronounced snap action to the movement of a movable point of said plate removed from the point of mounting, and whereby also said snap movement of said movable point is substantially about an axis different from the axis of either of said bends.

25. A snap acting device comprising a resilient plate having two inherent gradual developable bends overlapping each other so that they conflict, said bends having non-parallel axes, one bend being convex and the other concave, said bends being similar in width, conformation, and degree of curvature and being in all respects similar to each other with respect to the bisector of an angle between their axes, said plate having an outline form in its flat condition symmetrical with respect to said bisector, means for mounting said plate on said bisector, whereby said plate is symmetrical in all respects and exhibits a symmetrical snap action so that a movable portion of said plate on said bisector but removed from said point of mounting, moves with substantially the same snap characteristics in both directions of said snap motion.

WILLIAM B. ELMER.